Aug. 29, 1967     J. Z. DE LOREAN ETAL     3,338,229
AUXILIARY ACCESSORY UNITS ASSEMBLY AND DRIVE MEANS THEREFOR
Filed July 22, 1965     2 Sheets-Sheet 1
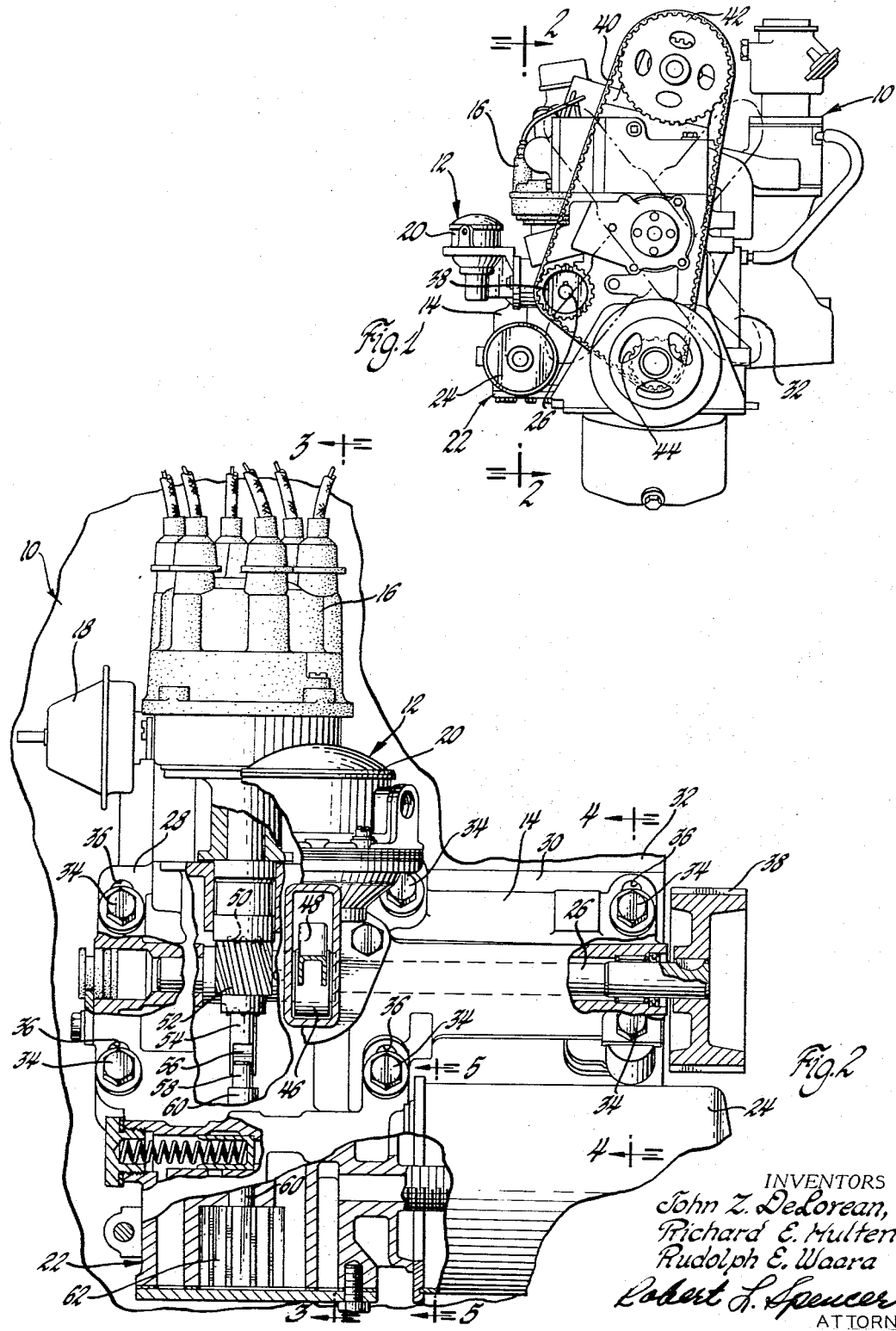
INVENTORS
John Z. DeLorean,
Richard E. Hulten &
Rudolph E. Waara
Robert L. Spencer
ATTORNEY INVENTORS
John Z. DeLorean,
Richard E. Hulten &
Rudolph E. Waara
Robert L. Spencer
ATTORNEY › # United States Patent Office 3,338,229
Patented Aug. 29, 1967

3,338,229
AUXILIARY ACCESSORY UNITS ASSEMBLY
AND DRIVE MEANS THEREFOR
John Z. De Lorean, Birmingham, Richard E. Hulten, Rochester, and Rudolph E. Waara, Pontiac, Mich., assignors to General Motors Corporation, Detroit, Mich., a corporation of Delaware
Filed July 22, 1965, Ser. No. 474,028
3 Claims. (Cl. 123—195)

ABSTRACT OF THE DISCLOSURE

An internal combustion engine mounts a detachable accessory package having an auxiliary shaft driven in timed relationship with the engine camshaft and crankshaft by a chain belt engaging sprockets on all three shafts. The accessory package carries a distributor, oil pump and fuel pump all driven from the auxiliary shaft and also carries an oil filter, and includes oil passages connecting with the engine oil system. The accessory package is slidably movable on its mounting surface to permit adjustment of the chain belt tension.

---

This invention is concerned with an internal combustion engine and more particularly with a driving system and supporting structure for an auxiliary accessory package which includes an oil pump and oil filter, fuel pump and distributor.

The conventional manner of mounting engine accessory units upon the engine block and taking power for actuation from the camshaft or crankshaft requires numerous flanges, attaching means, bearing and auxiliary drive belts and shafts. The placing of auxiliary units about the engine requires numerous parts and decreases the accessibility of the units for repair or replacement.

An object of this invention is to combine auxiliary units of an internal combustion engine into a single auxiliary accessory units package for mounting on a single supporting flange of the engine.

A further object of this invention is to have a single power take-off from the engine for driving the accessory units.

Another object of this invention is to have an auxiliary drive shaft for driving all the accessory units powered by means of a chain belt connected to the crankshaft and camshaft of the engine whereby proper timing of the engine components may be accomplished.

A further object of this invention is to provide an adjustable mounting means for the accessory units so that the tension of the chain belt may be adjusted by the sliding movement of the accessory units package on the mounting flange.

An additional object of this invention is to provide an accessory drive unit incorporating an accessory drive housing supporting a plurality of accessories and having a single accessory drive shaft driven by an engine together with means positioned within the housing for driving all of the accessories in response to rotation of the accessory drive shaft.

Another object of this invention is to provide an accessory drive of the type described wherein the accessory drive housing and all of the accessories supported on the housing may be quickly and easily removed as a unit for service of any one of the accessories.

A further object of this invention is to furnish an inexpensive drive wherein a plurality of accessories are driven from a single drive shaft and which may be quickly and easily assembled to and removed from an engine.

These and other objects of this invention will become more apparent as reference is made to the accompanying specification and drawings wherein:

FIGURE 1 is an end view of an internal combustion engine having an accessory units package mounted thereon according to the present invention;

FIGURE 2 is a view in the direction of the arrows, taken substantially along the line 2—2 of FIGURE 1, with sections cut away, showing the accessory units package consisting of the auxiliary drive shaft, distributor, fuel pump and oil pump and filter;

Figure 3:
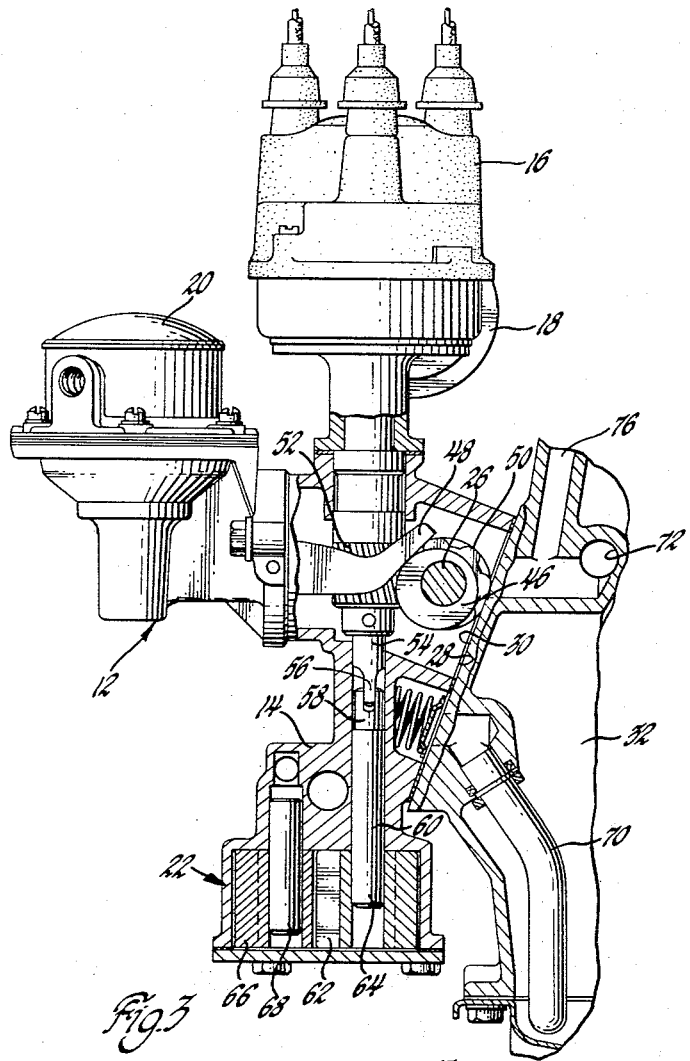
FIGURE 3 is a view in the direction of the arrows, substantially along the line 3—3 of FIGURE 2, with sections cut away to show the rocker arm of the fuel pump and associated cam and the oil pump and associated oil passages in the engine block and crankcase.
Figure 4:
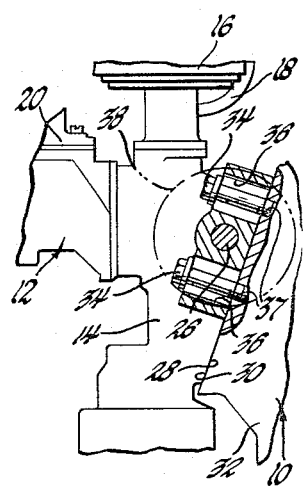
FIGURE 4 is a view in the direction of the arrows, substantially along the line 4—4 of FIGURE 2 illustrating the manner in which the accessory package is mounted to the engine block.

Referring now to the drawing, as best seen in FIGURE 1, an internal combustion engine indicated generally by the numeral 10, has an accessory units package 12 secured thereto.

As seen in FIGURES 2 and 3, the auxiliary accessory units package 12 includes a base casting or housing 14 to which a distributor 16 having a conventional vacuum assembly 18 and a fuel pump 20 is secured. A spur gear type oil pump 22 is housed in the base casting 14 and an oil filter 24 is attached thereto for filtering engine oil circulated by the oil pump. An auxiliary drive shaft 26 is journaled in the housing 14 for driving the various accessory units connected to or located in the housing.

Figure 5:
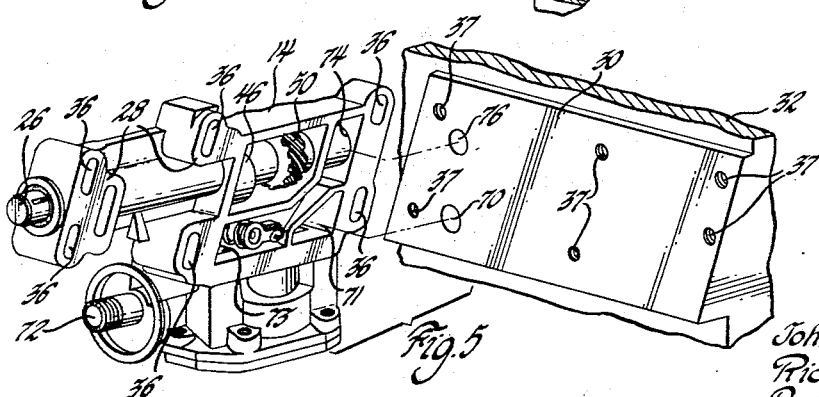
FIGURE 5 is an isometric view of the supporting flange of the engine block and the mating mounting face of the accessory units housing.

As can be seen in FIGURE 5, the accessory units package has a mounting face 28 adapted to be secured to a sloped supporting flange 30 on the engine block 32 of the internal combustion engine 10 by bolts 34 which are positioned in parallel elongated slots 36 formed in the housing 14, and adapted to be secured in the threaded apertures 37 in the engine block 32.

Referring again to FIGURES 1 and 2, an auxiliary drive sprocket 38 is keyed to the auxiliary drive shaft 26 for driving the auxiliary shaft. A chain belt 40 drivingly connects the sprocket 38 with the camshaft sprocket 42 and crankshaft sprocket 44 such that the auxiliary drive shaft 26 will be rotated and timed in phase with the camshaft and crankshaft. The slots 36 permit the mounting face 28 of housing 14 to be slidably moved on the sloped supporting flange 30 to adjust the tension of the chain belt 40 without changing the timing.

As best seen in FIGURES 2 and 3, a cam 46 is secured to auxiliary drive shaft 26 for rotation therewith and is positioned to contact and actuate a rocker arm 48 of the fuel pump 20 during rotation of the auxiliary shaft thereby operating the fuel pump in a conventional manner.

A worm gear 50 is secured to the auxiliary drive shaft 26 and is in meshing engagement with a distributor drive gear 52 secured to the distributor drive shaft 54 extending from the distributor 16 into the housing 14.

The end 56 of distributor drive shaft 54 within the housing 14 is shaped in a conventional manner to form a driving connection with the end 58 of the oil pump drive shaft 60 comprising the usual tang fitting in a slot. The oil pump drive shaft 60 is journaled in the housing 14 and has the driven spur gear 62 of the oil pump 22 secured to its other end 64. A slave spur gear 66 is in meshing engagement with spur gear 62 and is rotatably mounted on shaft 68 secured in the housing 14 parallel to oil pump drive shaft 60 such that slave spur gear 66 rotates with the driven spur gear 62 to pump oil through the engine in a conventional manner.

The engine oil is pumped from the oil sump of the engine through oil passage 70 into port 71 of housing 14 and through the oil pump 22 and oil filter 24. From the oil filter 24 the oil flows through passages 72, 73 in the housing 14 to outlet port 74 and into oil galleries 76 of engine block 32 for usual distribution throughout the engine 10.

For proper adjustment of the tension of chain belt 40, the bolts 34 are loosened, thus permitting the mounting face 28 of housing 14 to move relative to the supporting flange 30 within the limits permitted by the slots 36. When the proper tension of the chain belt is obtained, the bolts 34 are tightened to secure the housing in place.

For any repair or replacement of the auxiliary units, the bolts 34 may be removed and the accessory package removed as a unit for ease of performing such work. The ease of assembling the auxiliary components prior to attaching the accessory units package to the engine will reduce manufacturing cost and the possibility of improper assembling.

While but one embodiment of this invention is shown and described, variation and modification of this structure may be made without departing from the scope of the following claims.

We claim:
1. In combination with an internal combustion engine having a camshaft sprocket, a crankshaft sprocket and a supporting flange,
   a unitary accessory units package including a housing having a mounting face cooperating with said supporting flange to mount said package on said engine, an auxiliary drive shaft journaled in said housing, a drive sprocket secured to said auxiliary drive shaft, a plurality of engine accessories supported upon said housing and means within said housing for driving said accessories in response to rotation of said accessory drive shaft,
   chain-like means drivingly connecting said crankshaft sprocket with said camshaft sprocket and said drive sprocket to rotate said accessories in timed relationship with said crankshaft and camshaft during operation of said engine and
   means adjustably securing said housing mounting face in one of a plurality of positions on said supporting flange, said securing means permitting adjustment of said housing mounting face to any other of said positions on said flange to provide for adjusting the tension of said chain-like means by altering the position of said package on said engine, said securing means further permitting removal of said package as a unit from said engine to permit ease of servicing said accessories,
   said securing means including a plurality of elongated apertures in said housing mounting face and
   bolt means extending through said apertures and removably secured to said supporting flange,
   whereby loosening of said bolt means permits slidable movement of said package limited by the length of said apertures and tightening of said bolt means fixes the position of said package on said supporting flange.

2. The combination of claim 1 wherein said engine accessories include an oil pump driven by said auxiliary shaft through worm gear means and said housing further mounts oil filter means and includes passage means connecting said oil pump with said oil filter means and opening through said mounting face to connect with engine oil passages opening through said supporting flange, said passages being arranged for communication in all positions of adjustment of said housing on said supporting flange.

3. The combination of claim 2 wherein said auxiliary drive shaft carries an eccentric and said accessories include a fuel pump actuable by said eccentric and a distributor connected with and driven by the gear means of said oil pump drive.

References Cited
UNITED STATES PATENTS

| 1,174,551 | 3/1916 | Dodge et al. | 123—195 |
| 1,422,995 | 7/1922 | Link | 123—195 |
| 1,626,364 | 4/1927 | Starr | 123—195 |
| 1,672,191 | 6/1928 | Anderson et al. | 123—195 |
| 2,010,056 | 8/1935 | Brush | 123—195 |
| 2,731,008 | 1/1956 | Porsche et al. | 123—195 |

FOREIGN PATENTS 507,106  6/1939  Great Britain.

CARLTON R. CROYLE, *Primary Examiner.*
WENDELL E. BURNS, *Examiner.*